March 13, 1962 K. M. GERTEIS ET AL 3,024,619

HEAT PUMP SYSTEM

Filed Sept. 8, 1960

*INVENTOR.*
KARL M. GERTEIS
RAYMOND G. MC CREADY
BY
*Herman Seid*
ATTORNEY.

United States Patent Office 3,024,619
Patented Mar. 13, 1962

3,024,619
HEAT PUMP SYSTEM
Karl M. Gerteis, Cazenovia, and Raymond G. McCready, De Witt, N.Y., assignors to Carrier Corporation, Syracuse, N.Y., a corporation of Delaware
Filed Sept. 8, 1960, Ser. No. 54,673
10 Claims. (Cl. 62—160)

This invention relates to heat pump systems, and more particularly to a heat pump system having means providing for improved heat exchange capacity for a heat pump system of predetermined design.

In prior heat pump systems, subcooling has been used to increase the heat exchange capacity of the system during both the heating and cooling cycles. If, in a given system, the indoor heat exchanger, used as an air cooling evaporator during the cooling cycle and as an air heating condenser during the heating cycle, did not provide adequate heat during the heating cycle, an additional indoor heat exchanger was employed as a subcooler to increase the heating capacity of the system. In such system, during cooling operation, the subcooler was inactive.

Similarly, the provision of an additional outdoor heat exchanger as a subcooler increased the cooling capacity of a given system, but during heating operation the subcooler was inactive. In each case, the subcooler was not used in an efficient manner during the reverse cycle of operation.

It is with the problem of increasing the heat exchange capacity of a heat pump system that the present invention was evolved, means providing for increased heat exchange capacity during one cycle of operation, without adversely affecting the heat exchange capacity during the other cycle of operation.

A primary object of this invention is to provide a heat pump system with means to increase the heat exchange capacity of such system.

An object of this invention is to provide a heat pump system with novel means for increasing the heat exchange capacity during one cycle of operation without adversely affecting the heat exchange capacity during the other cycle of operation.

Another object of this invention is to provide a heat pump system with valve mechanism for increasing the heating capacity of the system without adversely affecting the cooling capacity of such system, or alternatively, for increasing the cooling capacity of such system without adversely affecting the heating capacity of such system.

Another object of this invention is to provide a heat pump system with an auxiliary outdoor air heat exchanger which acts as a subcooler during the cooling cycle, and which acts as a part of the evaporator during the heating cycle.

Still another object of the present invention is to increase the heat exchange capacity of a heat pump system by providing novel valve mechanism to cause the auxiliary outdoor air heat exchanger to act as a subcooler during the cooling cycle and as a portion of the evaporator during the heating cycle.

This invention relates to a heat pump system including an outdoor heat exchange coil and an indoor heat exchange coil, the heat pump system having means for increasing the capacity thereof comprising an auxiliary coil disposed adjacent one of the heat exchange coils, the auxiliary coil being upstream with respect to air passing over the adjacent heat exchange coil and means connecting the auxiliary coil to the adjacent heat exchange coil and to the heat pump system, the connecting means responsive to a first mode of operation to connect the auxiliary coil as a part of the adjacent heat exchange coil and responsive to a second mode of operation to connect the auxiliary coil as a subcooler.

This invention further relates to a heat pump system comprising a first outdoor air heat exchanger, a second outdoor air heat exchanger located adjacent and downstream with respect to the flow of outdoor air over the first heat exchanger, an indoor heat exchanger, a refrigerant compressor, refrigerant flow reversal means, means including suction and discharge lines connecting said reversal means to the compressor, first refrigerant flow means connecting the reversal means and the indoor heat exchanger, second refrigerant flow means connecting said indoor heat exchanger with the first outdoor heat exchanger and with the second outdoor heat exchanger, third refrigerant flow means connecting the second outdoor air heat exchanger with the reversal means, and fourth refrigerant flow means connecting the first outdoor heat exchanger with the second refrigerant flow means and with the third refrigerant flow means, the refrigerant reversal means during air heating operation directing refrigerant through the first refrigerant flow means to the indoor heat exchanger from which the refrigerant flows through the second refrigerant flow means to the first and second outdoor heat exchangers from which part of the refrigerant flows through the third refrigerant flow means to the reversal means and the remainder of the refrigerant flows through the fourth refrigerant flows means to the third refrigerant flow means, the reversal means during air cooling operation directing refrigerant through the third refrigerant flow means to the second outdoor heat exchanger from which the refrigerant flows through a part of the second refrigerant flow means to the first outdoor heat exchanger from which the refrigerant flows through the fourth refrigerant flow means to the second refrigerant flow means from which the refrigerant flows to the indoor heat exchanger to the first refrigerant flow means from which the refrigerant flows to the reversal means.

For a better understanding of our invention reference may be had to the accompanying drawing in which like numerals refer to like elements and in which.

Figure 1:
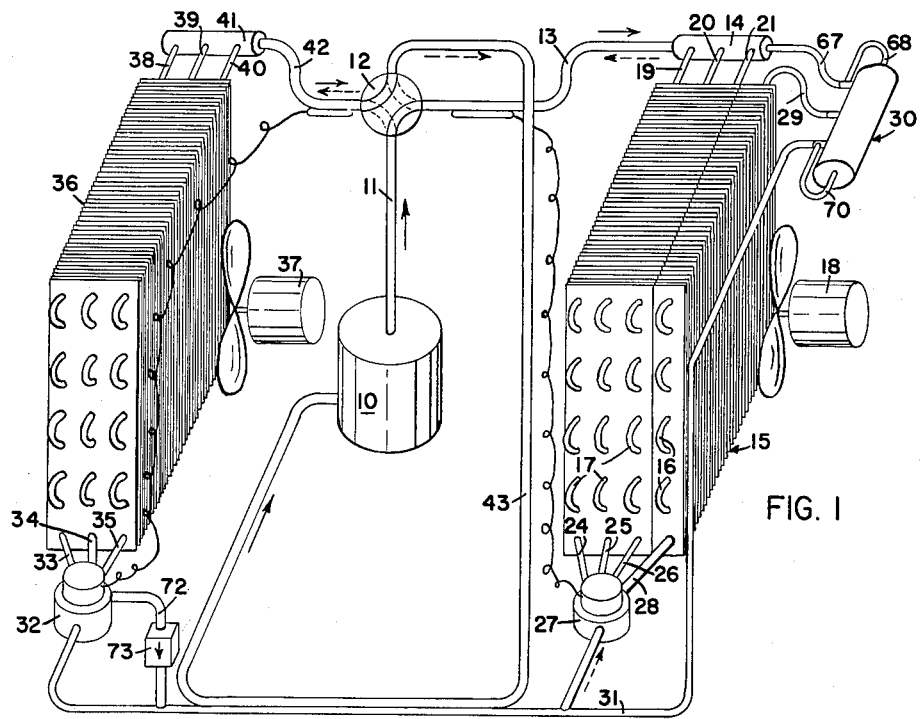
FIGURE 1 is a diagrammatic view of a heat pump system embodying a preferred form of the present invention.

Referring now to FIGURE 1, the heat pump system illustrated comprises a motor compressor unit 10 which forwards high pressure refrigerant to the refrigerant flow reversing means, preferably a four-way valve 12, through discharge line 11. During cooling operation valve 12 is adjusted to route the refrigerant from the discharge line 11 through line 13 to the header 14 of the outdoor heat exchanger 15. The solid line arrows along the tubing indicate the direction of the flow of the refrigerant during the cooling cycle; the dotted line arrows indicate the direction of refrigerant flow during the heating cycle.

Outdoor air heat exchanger 15 may be provided with three vertical rows 17 of finned tubes forming the main outdoor air heat exchanger and has an additional vertical row 16 of finned tubes located upstream with respect to outdoor air flow over the rows 17. Fan means 18 passes ambient air first over row 16 and then over rows 17. The high pressure vaporous refrigerant flowing through the outdoor heat exchanger is condensed in rows 17 and is subcooled in row 16 to increase the cooling capacity of the system.

The refrigerant flows from header 14 through lines 19, 20, and 21 respectively to each of the rows 17 of the main outdoor heat exchanger.

The refrigerant flows from each of the rows 17 through lines 24, 25, 26, respectively to the thermal expansion valve 27. The thermal expansion valve 27 acts as a check valve during the cooling cycle, therefore, refrigerant flows through line 28 which is of greater diameter than line 24, 25, or 26, to the row 16 which acts as a subcooler. The refrigerant flows through line 29 to the valve mechanism 30 and then from valve mechanism 30 through line 31 through thermal expansion valve 32 through lines 33, 34, and 35 to the indoor heat exchanger 36.

The fan means 37 passes air to be cooled over the indoor heat exchanger. The indoor air is cooled by the evaporating refrigerant.

The refrigerant then flows through lines 38, 39 and 40 to header 41 and then through line 42 to refrigerant flow reversing valve 12 and back through suction line 43 to compressor 10.

Figure 2:
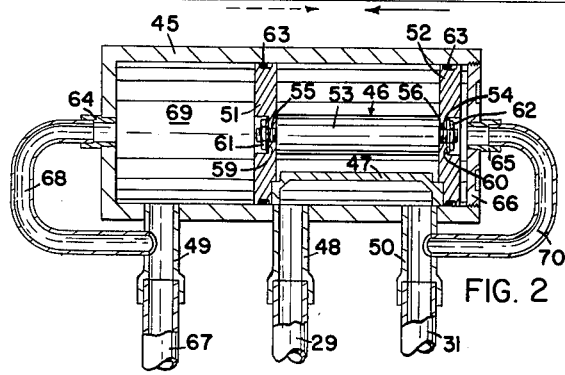
FIGURE 2 is a sectional view on an enlarged scale of the valve mechanism illustrated in FIGURE 1 showing the valve mechanism during cooling operation.
Figure 3:
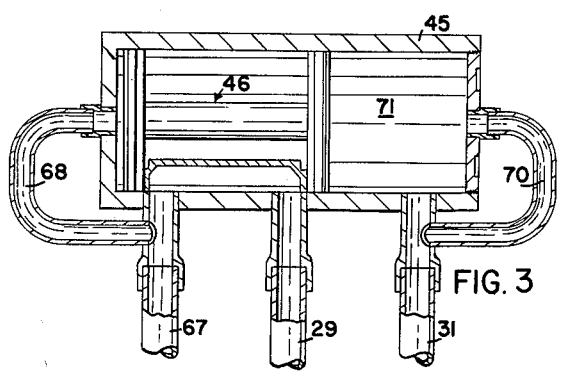
FIGURE 3 is a sectional view on an enlarged scale of the valve mechanism illustrated in FIGURE 1 showing the valve mechanism during heating operation.

Valve mechanism 30, shown more clearly in FIGURES 2 and 3, is comprised of a valve body 45 having mounted therein a piston assembly 46. Valve block 47 which is operatively connected with piston assembly 46 communicates the center stub 48 with either stub 49 or stub 50. The piston assembly, which is responsive to fluid pressure within lines 31 and 67 is comprised of a piston head 51, piston head 52, interconnected by rod 53. At each end the rod has a reduced threaded portion 54 which extends through a suitable opening 55, 56 in each piston head. The shoulders formed at each end of rod 53 bear against the inner surfaces of the piston heads and, in effect, space the piston heads one from the other. A washer 59, 60 may be placed over the outer end of each threaded portion 54 and a nut 61, 62 secures the piston heads to the rod 53. O-rings 63 are provided to prevent the flow of liquid into the chamber defined between the piston heads and valve body 45. Stub 64 extends from one end of body 45 and stub 65 extends from wall 66 which is detachably secured to valve body 45. Pilot line 68 connects line 67 with the chamber 69 defined between piston 51 and valve body 45. Pilot line 70 connects line 31 with the chamber defined between piston head 52 and valve body 45.

During cooling operation, refrigerant flows through line 67 and line 68 to chamber 69 forcing the piston assembly 46 to the right, as viewed in FIGURE 2, communicating lines 29 and lines 31. During heating operation, refrigerant flows through line 31, line 70 to chamber 71 forcing the piston assembly to the left, as viewed in FIGURE 3, communicating lines 29 and 67.

It is noted in FIGURE 1 that line 72 bypasses the thermal expansion valve 32. Within line 72 there is provided a check valve 73. Refrigerant flows through thermal expansion valve 32 during cooling operation and is bypassed about the valve through line 72 during heating operation.

Figure 4:
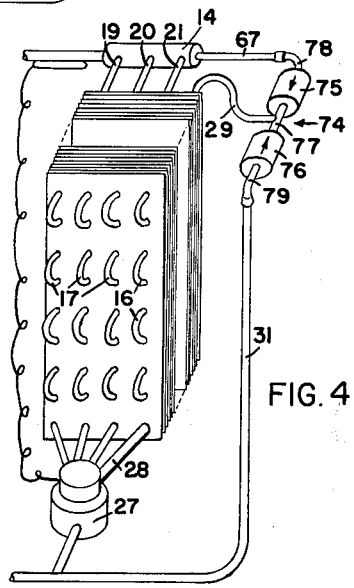
FIGURE 4 is a diagrammatic view of a portion of the heat pump system illustrating a modified valve mechanism.

Referring to FIGURE 4, there is shown a portion of the heat pump system including a modified valve mechanism 74. The heat pump system of FIGURE 4 is the same as that of FIGURE 1 except for the modified valve mechanism. The valve mechanism 74 comprises two check valves 75 and 76 interconnected by tube 77. Valve 75 is connected to line 67 through elbow 78 and valve 76 is connected to line 31 through elbow 79. The arrowhead on each valve 75 and 76 represents the normal direction of refrigerant flow through the respective valve.

*Operation*

During indoor air cooling operation, the refrigerant flow reversing valve 12 routes refrigerant from the compressor 10 through line 13 to the header 14. Refrigerant flows through lines 19, 20, and 21 to the rows 17 of the main outdoor heat exchanger. It is noted that the refrigerant enters at the top of each row, flows down through the row and is discharged at the bottom through lines 24, 25 and 26 to the thermal expansion valve 27. As the valve 27 acts as a check valve during cooling operation, refrigerant flows through line 28 to row 16 which acts as a subcooler. The line 28 is of sufficient diameter to prevent flashing of refrigerant in row 16. The refrigerant then flows through line 29 through line 31 to valve 32. The refrigerant flows through valve 32, lines 33, 34, 35 through each of the rows of the indoor heat exchanger 36. From indoor heat exchanger 36 the refrigerant flows through lines 38, 39, and 40 to header 41 and from header through line 42 to the reversing valve 12 and back to the compressor through suction line 43.

During the air heating cycle, the reversing valve routes the refrigerant from the compressor 10 through line 42 to header 41. The refrigerant flows through lines 38, 39, and 40 through indoor heat exchanger 36 which functions as a heat dissipating condenser, then through lines 33, 34 and 35 to the thermal expansion valve 32. During heating operation thermal expansion valve 32 functions as a check valve. Refrigerant, therefore, flows through bypass line 72, valve 73 and through line 31 to the valve mechanism 30. The pressure within the line 31 and pilot line 70 forces the valve block to the position shown in FIGURE 3, preventing the flow of refrigerant through chamber 71. Thus, the refrigerant flows through line 31, thermal expansion valve 27 and lines 24, 25, 26 and 28 to the outdoor heat exchanger. Refrigerant flowing through rows 17 flows through lines 19, 20, and 21 to header 14 and from header 14 through line 13 to reversing valve 12 and back to compressor 10. The refrigerant flowing through row 16 flows through line 29 to valve mechanism 30 through line 67 back to header 14. Thus, it is seen that our novel heat pump system takes advantage of the auxiliary outdoor coil to provide extra system heating capacity during the heating cycle without adversely affecting cooling operation.

Valve mechanism 74 shown in FIGURE 4 operates in a similar fashion to valve mechanism 30. During the cooling cycle, refrigerant flows through header 14 and lines 19, 20 and 21 respectively to the rows 17, through the rows 17 to the thermal expansion valve 27, through line 28 to row 16, then through line 29, check valve 76, elbow 79 to line 31. Row 16 on the cooling cycle acts as a subcooler coil to further reduce the temperature of the refrigerant leaving the outdoor heat exchanger. During the heating cycle, refrigerant flows through check valve 27 and through lines 24, 25, 26 and 28 through each row of the outdoor heat exchanger 15. Refrigerant discharges from rows 17 through lines 19, 20, and 21 to header 14. Refrigerant flowing through row 16 discharges into row 29 through check valve 75, elbow 78 and line 67 back to the header 14. It can be seen that the valve mechanism 74 functions in the system in the same manner as the valve mechanism 30 to increase the heat exchange capacity of the system during both heating and cooling operation.

Our invention has particular utility where it is desirable to increase the heat exchange capacity of an existing system. A preferred embodiment of our invention provides a greater heating capacity than heretofore possible for a system having a predetermined cooling capacity. This embodiment of our invention provides a heat pump system with an auxiliary outdoor heat exchanger which acts as a subcooler during the cooling cycle and which acts as a part of the evaporator during the heating cycle. The heating capacity of the system may be increased without adversely affecting the cooling capacity of the system.

It will be appreciated by those versed in the art that it is within the scope of the invention that a valve mechanism and subcooler coil may be applied to the indoor heat exchanger when it is desired to provide increased cooling capacity for a predetermined heating capacity.

In a heat pump system having no subcooling, a valve mechanism and subcooler coil may be added to both the

We claim:

1. In a heat pump system including an outdoor heat exchange coil and an indoor heat exchange coil, means for increasing the capacity of the heat pump system comprising an auxiliary coil disposed adjacent at least one of said heat exchange coils, said auxiliary coil being upstream with respect to air passing over said one of said heat exchange coils, and means connecting said auxiliary coil to said one of said heat exchange coils and to the heat pump system, said connecting means responsive to a first mode of system operation to connect said auxiliary coil as a part of said one of said heat exchange coils and reponsive to a second mode of system operation to connect said auxiliary coil as a subcooler.

2. A heat pump system comprising a first outdoor heat exchanger, a second outdoor heat exchanger located adjacent and downstream with respect to the flow of outdoor air over said first heat exchanger, an indoor heat exchanger, a refrigerant compressor, refrigerant flow reversal means, means including suction and discharge lines connecting said reversal means to said compressor, first refrigerant flow means connecting said reversal mean and said indoor heat exchanger, a second refrigerant flow means connecting said indoor heat exchanger with said first outdoor heat exchanger and with said second outdoor heat exchanger, third refrigerant flow means connecting said second outdoor heat exchanger with said reversal means and fourth refrigerant flow means connecting said first outdoor heat exchanger with said second refrigerant flow means and with said third refrigerant flow means, said reversal means during air heating operation directing refrigerant through said first refrigerant flow means to said indoor heat exchanger from which the refrigerant flows through said second refrigerant flow means to said first and second outdoor heat exchangers from which part of the refrigerant flows through the first outdoor heat exchanger through the third refrigerant flow means to said reversal means and the remainder of the refrigerant flows through said second outdoor heat exchanger through said fourth refrigerant flow means to said third refrigerant flow means, said reversing means during air cooling operation directing refrigerant through said third refrigerant flow means to said second outdoor heat exchanger from which the refrigerant flows through part of the second refrigerant flow means to the first outdoor heat exchanger from which the refrigerant flows through said fourth refrigerant flow means to said second refrigerant flow means from which the refrigerant flows through said second refrigerant flow means to said indoor heat exchanger from which the refrigerant flows through said first refrigerant flow means to said reversing means.

3. A heat pomp system as in claim 2 wherein said reversal means comprises a four-way reversing valve.

4. A heat pump system as in claim 2 wherein said fourth refrigerant flow means comprises a valve mechanism, a first line connecting said valve mechanism to said second refrigerant flow means, a second line connecting said valve mechanism to said third refrigerant flow means and a third line connecting said valve mechanism to said first outdoor heat exchanger.

5. A heat pump system as in claim 4 wherein said valve mechanism includes means movable in response to pressure within said first line and said second line to selectively communicate said third line with either the first line or the second line.

6. A heat pump system as in claim 4 wherein said valve mechanism comprises a body, a valve block within said body selectively communicating said third line with either said first line or said second line, a piston on each end of said valve block, each piston cooperating with said body to define a first chamber and a second chamber within said body, a first pilot line communicating said first line with said first chamber and a second pilot line communicating said second line with said second chamber.

7. A heat pump system as in claim 4 wherein said valve mechanism comprises a first check valve, a second check valve and tubular means connecting said valves to one another, said first line being connected to said second check valve, said second line being connected to said first check valve and said third line communicating with said connecting means.

8. A heat pump system comprising a reverse cycle refrigeration system including a compressor, a refrigerant flow reversing valve, a discharge line and a suction line connecting said compressor to said reversing valve, an outdoor heat exchanger comprising a first section and a second section, an indoor heat exchanger, first refrigerant flow means connecting said reversing valve with said indoor heat exchanger, second refrigerant flow means connecting said indoor heat exchanger with said outdoor heat exchanger, said second refrigerant flow means comprising a first thermal expansion valve adjacent said indoor heat exchanger, a second thermal expansion valve adjacent said outdoor heat exchanger, a liquid line communicating said first and second thermal expansion valves and a line bypassing said first thermal expansion valve, said first thermal expansion valve functioning as a check valve during air heating operation and said second thermal expansion valve functioning as a check valve during air cooling operation, third refrigerant flow means connecting said second section of said outdoor heat exchanger with said reversing valve and fourth refrigerant flow means selectively communicating said first section of said outdoor heat exchanger with said second refrigerant flow means or with said third refrigerant flow means, said reversing valve during air heating operation directing refrigerant through said first refrigerant flow means to said indoor heat exchanger from which the refrigerant flows through said bypass line to said second thermal expansion valve from which part of the refrigerant flows through the second section of the outdoor heat exchanger to the third refrigerant flow means to the reversing valve and the remainder of the refrigerant flows through said first section of the outdoor heat exchanger to the fourth refrigerant flow means from which the refrigerant flows through the third refrigerant flow means to said reversing valve, said reversing valve during air cooling operation directing refrigerant through said third refrigerant flow means to said second section of the outdoor heat exchanger from which the refrigerant flows through said first section of the outdoor heat exchanger to the fourth refrigerant flow means to the second refrigerant flow means to the first thermal expansion valve from which the refrigerant flows through the indoor heat exchanger to the first refrigerant flow means from which the refrigerant flows to the reversing valve.

9. In a heat pump system including an outdoor heat exchanger and an indoor heat exchanger, means for increasing the heat exchange capacity of the heat pump system comprising an additional heat exchanger disposed adjacent one of said heat exchangers, said additional heat exchanger being upstream with respect to air passing over said one of said heat exchangers, and means connecting said additional heat exchanger to said one of said heat exchangers, said connecting means including a valve mechanism, said valve mechanism being responsive to a first mode of heat pump system operation to connect said additional heat exchanger in the system as a subcooler and being responsive to a second mode of heat pump system operation to connect said additional heat exchanger in the system as a part of said one of said heat exchangers.

10. In a heat pump system including an outdoor heat exchanger and an indoor heat exchanger, means for increasing the heat exchange capacity of the heat pump system comprising an additional heat exchanger disposed adjacent one of said heat exchangers, and means connecting said additional heat exchanger to said one of said heat exchangers, said connecting means including a valve mechanism, said valve mechanism being responsive to a first mode of heat pump system operation to connect said additional heat exchanger in the system as a subcooler and being responsive to a second mode of heat pump system operation to connect said additional heat exchanger in the system as a part of said one of said heat exchangers.

References Cited in the file of this patent

UNITED STATES PATENTS 2,474,304   Clancy _____ June 28, 1949

OTHER REFERENCES

Operation, Servicing of Air-to-Air Heat Pump, in Air Conditioning and Refrigeration News, January 4, 1954, pages 26 and 27.